US008682312B2

(12) United States Patent
Yu

(10) Patent No.: US 8,682,312 B2
(45) Date of Patent: Mar. 25, 2014

(54) METHOD, SYSTEM AND SERVICE CONTROL POINT FOR REALIZING CALL MANAGEMENT

(75) Inventor: Qian Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 617 days.

(21) Appl. No.: 12/540,642

(22) Filed: Aug. 13, 2009

(65) Prior Publication Data
US 2010/0041379 A1 Feb. 18, 2010

Related U.S. Application Data

(63) Continuation of application No. PCT/CN2009/070012, filed on Jan. 4, 2009.

(30) Foreign Application Priority Data

Aug. 13, 2008 (CN) .......................... 2008 1 0030152

(51) Int. Cl.
*H04B 1/10* (2006.01)
*H04M 3/42* (2006.01)

(52) U.S. Cl.
USPC ............... 455/422.1; 455/414.1; 455/415; 375/245

(58) Field of Classification Search
USPC ............... 455/422.1, 414.1, 415; 375/142.05, 375/142.09, 201.02, 245
See application file for complete search history.

(56) References Cited

U.S. PATENT DOCUMENTS

| 5,309,512 | A | * | 5/1994 | Blackmon et al. ........ 379/215.01 |
| 2001/0005372 | A1 | * | 6/2001 | Cave et al. .................... 370/401 |
| 2001/0036252 | A1 | * | 11/2001 | Renner et al. ................ 379/67.1 |
| 2003/0059023 | A1 | * | 3/2003 | Crockett et al. ......... 379/220.01 |
| 2006/0246881 | A1 | * | 11/2006 | Winkler et al. ............... 455/415 |
| 2007/0232285 | A1 | * | 10/2007 | Lush et al. .................... 455/418 |
| 2008/0159500 | A1 |   | 7/2008 | Wang |

FOREIGN PATENT DOCUMENTS

| CN | 1538723 A | 10/2004 |
| CN | 1549559 A | 11/2004 |
| CN | 1677993 A | 10/2005 |
| CN | 1705330 A | 12/2005 |

(Continued)

OTHER PUBLICATIONS

1st Office Action in corresponding Chinese Application No. 200810030152.0 (Sep. 13, 2010).
Written Opinion of the International Searching Authority in corresponding PCT Application No. PCT/CN2009/070012 (May 28, 2009).
International Search Report in corresponding PCT Application No. PCT/CN2009/070012 (May 28, 2009).

(Continued)

*Primary Examiner* — Ariel Balaoing
(74) *Attorney, Agent, or Firm* — Leydig, Voit & Mayer, Ltd.

(57) ABSTRACT

A method, a system, and a service control point (SCP) for realizing call management are provided. The method for realizing call management includes: inquiring user information of a calling terminal according to a call request message of the calling terminal; sending the user information of the calling terminal, over a called terminal; and exercising a corresponding call control according to a response made by the called terminal to a call carrying the user information of the calling terminal. With the method, system, and SCP for realizing call management provided by the embodiments of the present invention, the called terminal may selectively answer the call according to the user information of the calling terminal, thereby avoiding disturbing the work due to answering some unnecessary calls.

14 Claims, 7 Drawing Sheets

(56) References Cited

FOREIGN PATENT DOCUMENTS

| | | |
|---|---|---|
| CN | 1863233 A | 11/2006 |
| CN | 1866997 A | 11/2006 |
| CN | 1960399 A | 5/2007 |

OTHER PUBLICATIONS

2$^{nd}$ Office Action in corresponding Chinese Application No. 200810030152.0 (Dec. 9, 2011).
Rejection Decision in corresponding Chinese Patent Application No. 200810030152.0 (Aug. 1, 2012).

\* cited by examiner

METHOD, SYSTEM AND SERVICE CONTROL POINT FOR REALIZING CALL MANAGEMENT

CROSS-REFERENCE TO RELATED APPLICATIONS

This application is a continuation of International Patent Application No. PCT/CN2009/070012, filed Jan. 4, 2009, which claims priority to Chinese Patent Application No. 200810030152.0, filed Aug. 13, 2008, both of which are hereby incorporated by reference in their entireties.

FIELD OF THE TECHNOLOGY

Embodiments of the present invention relate to the field of communication technologies, and particularly to a method, system, and service control point for realizing call management.

BACKGROUND

A service control point (SCP) is a core of a mobile intelligent network in the present communication network, and is loaded with a service logic and user data. When a user of a mobile intelligent network initiates a call or is called, a mobile switching center or service switching point (MSC/SSP) reports a detect point (DP) message or an initial detect point (IDP) message to the SCP, thereby initiating a mobile intelligent service on the SCP, and a call process is controlled by the SCP. The SCP controls the call basically in such a way that after the call triggers the SCP, the SCP starts an intelligent service logic for performing basic call processing (e.g., obtaining a calling number and a called number through analyzing), inquires the user data for performing call authentication, analyzes validity of the user's account, if the call is determined to be valid, requires the MSC/SSP to continue the call, and performs accounting. Finally the control process in the SCP ends after a user of a terminal hangs up, and a call control is completed.

In the communication network, each access terminal has an identifier. For example, there is a number for accessing a global system for mobile communication (GSM) network, a public switched telephone network (PSTN), a code division multiple access (CDMA) network, and the like. The number is transferred to a called terminal by the communication network when a calling terminal initiates a call. A user of the called terminal may see the number of the calling terminal as long as he or she has launched a call ID display service.

Taking the GSM network as an example, the MSC sends a call request of the calling terminal to a network in which the called terminal is located when a call occurs. The network in which the called terminal is located sends a call with a calling terminal number to the called terminal. The called terminal decides whether to answer the call or not according to the received calling terminal number, or inquires user information of the calling terminal from user information phonebook it stores according to the received calling terminal number and decides whether to answer the call or not according to an inquiry result.

Currently, since the called terminal can only receive a string of digital signals and cannot carry more information, the calling terminal number can be identified solely on the called terminal. However, when the following situations occur, for example, 1), the called terminal has not been informed of the calling terminal number; 2), the terminal's phonebook cannot record information of all numbers due to a limited capacity (for example, there is thousands of persons in a consortium, but only one hundred to two hundred persons are recorded in the terminal's phonebook); and 3), the terminal's phonebook is lost due to loss of the terminal and so on, the terminal may not display enough user information, so that it is difficult for the user of the called terminal to determine whether to answer the call or not.

In reality, there are many situations that the user of the called terminal is willing to selectively answer the phone, for example, it is probable that he or she does not want to answer calls from telemarketers when attending a conference or carrying out an important work. Usually, people may remember a small number of telephone numbers, which are only some frequently-used numbers, and such few numbers cannot cope with an ever increasing communication requirement. Therefore, in many situations, the user of the called terminal may only answer the phone tentatively and then hang up quickly, but the ongoing work has already been disturbed.

SUMMARY

Embodiments of the present invention provide a method and system for realizing call management, which enables a user of a called terminal to choose whether to answer a call or not according to user information of a calling terminal, thereby realizing call management. The embodiments of the present invention also provide a service control point (SCP) adapted to provide the user information of the calling terminal for the called terminal.

To solve the above technical problems, an embodiment of the present invention provides a method for realizing call management, which includes: (1) inquiring, by a service control point (SCP), user information of a calling terminal according to a call request message of the calling terminal; (2) sending, by the SCP, the user information of the calling terminal to the called terminal forwarded by a MSC; and (3) exercising, by the SCP, corresponding call control, according to a response made by the called terminal, over a call carrying the user information of the calling terminal.

Accordingly, an embodiment of the present invention also provides a system for realizing call management, which includes: an SCP, adapted to inquire user information of a calling terminal according to a call request message of the calling terminal forwarded by a MSC, send the user information of the calling terminal to a called terminal, and exercise corresponding call control, according to a response made by the called terminal, over a call carrying the user information of the calling terminal.

Accordingly, an embodiment of the present invention also provides a computer program product, stored on a computer readable media, having computer executable instructions configuring a computer to perform a method for realizing call management which includes: (1) inquiring, user information of a calling terminal according to a call request message of the calling terminal; (2) sending, the user information of the calling terminal to a called terminal; and (3) exercising, corresponding call control according to a response made by the called terminal, over a call carrying the user information of the calling terminal.

In the embodiments of the present invention, the user information of the calling terminal is obtained by the SCP inquiring user information database according to the call request message of the calling terminal, so that the called terminal may selectively answer the call according to the received user information of the calling terminal, thereby avoiding to disturbing of the work due to answering some unnecessary calls.

DETAILED DESCRIPTION

The present invention will be described in further details with reference to the accompanying drawings hereinafter.

According to embodiments of the present invention, when a calling terminal initiates a call, user information of the calling terminal is inquired through a user information inquiring mode of a service control point (SCP), and the user information is sent to a called terminal, so that the called terminal may choose whether to answer the call or not according to the user information of the calling terminal, thereby realizing call management.

Figure 1:
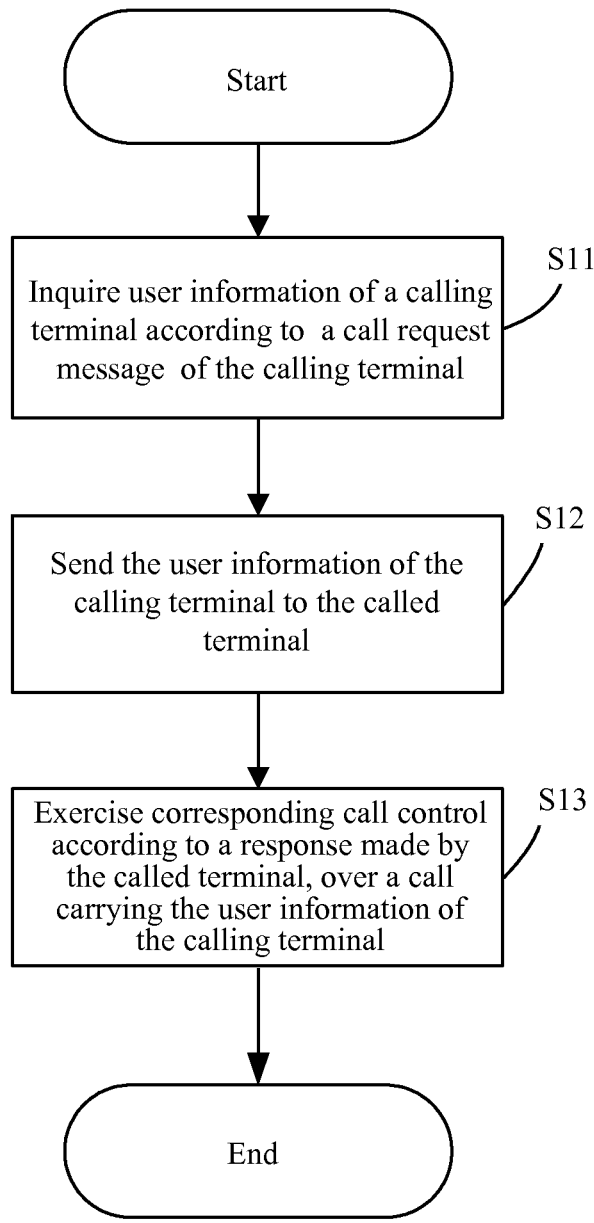
FIG. 1 is a schematic flowchart of a method for realizing call management according to an embodiment of the present invention.

FIG. 1 is a schematic flowchart of a method for realizing call management according to an embodiment of the present invention. As shown in FIG. 1, the method for realizing call management according to an embodiment of the present invention includes the following steps.

In Step 11, user information of a calling terminal is inquired according to a call request message of the calling terminal.

Herein, the SCP provides a function for inquiring the user information of the calling terminal, and automatically inquires the user information of the calling terminal after receiving the call request message from the calling terminal. The call request message of the calling terminal includes a calling terminal number and a called terminal number. The SCP may inquire a user information database to obtain the user information of the calling terminal, such as name, position and home location, according to the known calling terminal number. The SCP may also inquire the user information database to obtain the user information of the calling terminal according to both the calling terminal number and the called terminal number. The user information database may be configured on the SCP, and may also be configured on an apparatus other than the SCP.

In Step 12, the user information of the calling terminal is sent to a called terminal.

In this embodiment, the user information of the calling terminal may be sent to the called terminal via a short message, an unstructured supplementary service data (USSD) message, a caller ID display, an interactive voice response (IVR) call, or the like.

In Step 13, a corresponding call control is exercised, according to a response made by the called terminal, over a call carrying the user information of the calling terminal.

In this embodiment, as the called terminal receives the user information of the calling terminal and the call, when the called terminal selects to answer the call according to the user information of the calling terminal, a conversation connection is established between the calling terminal and the called terminal, and the control process of the SCP ends after the conversation ends. When the called terminal selects to reject the call according to the user information of the calling terminal, the SCP instructs to cut off the call. When the called terminal neither selects to answer the call nor selects to reject the call (for example, the user is not near the called terminal), the SCP finally instructs to cut off the call when a response message is not received from the called terminal in a predefined period of time.

Figure 2:
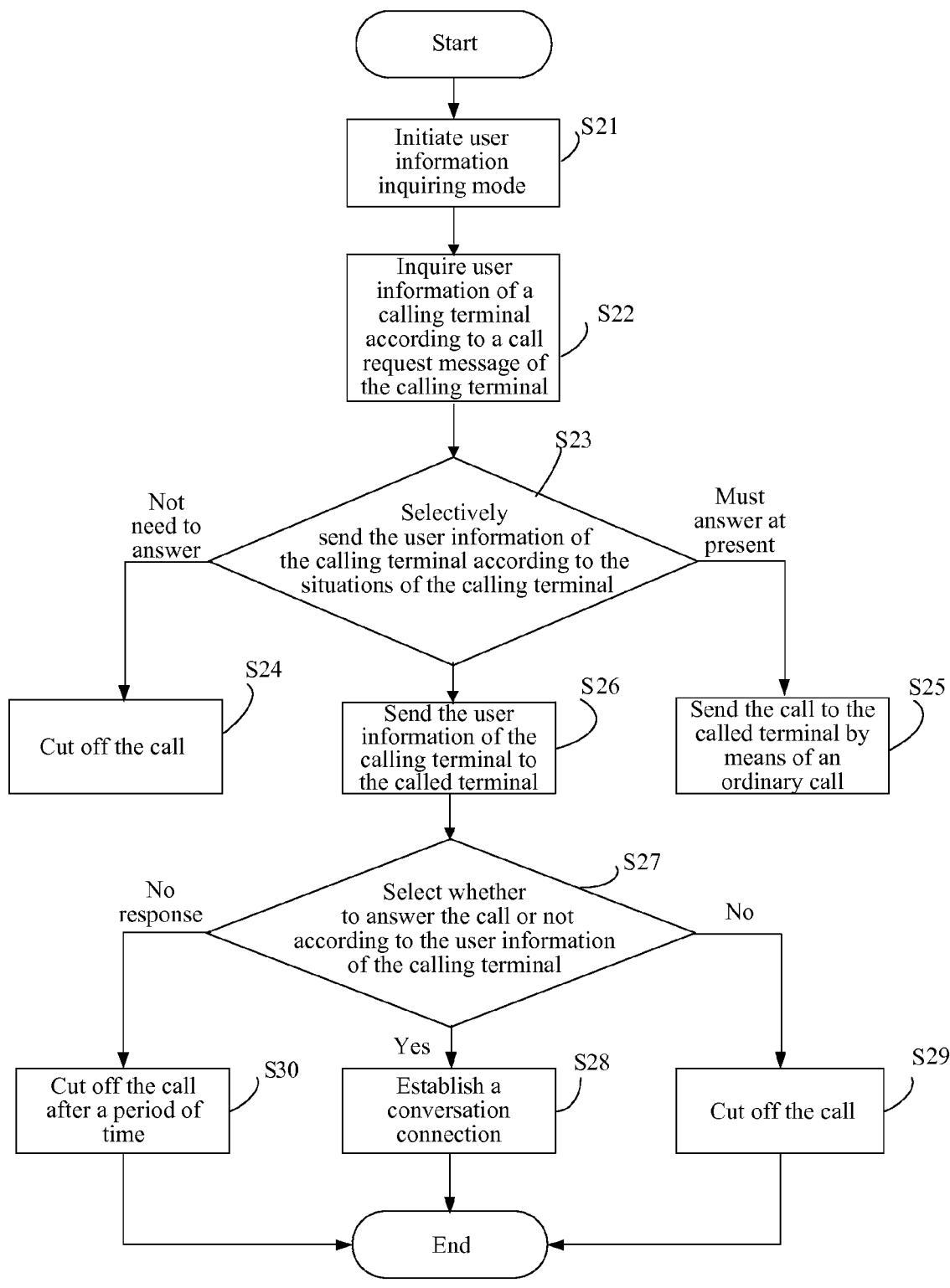
FIG. 2 is a schematic flowchart of the method for realizing call management according to another embodiment of the present invention.

FIG. 2 is a schematic flowchart of the method for realizing call management according to another embodiment of the present invention. As shown in FIG. 2, the method includes following steps.

In Step 21, a user information inquiring mode is initiated.

In this embodiment, a CAMEL subscription information (CSI) of the terminal is set in a home location register (HLR) in advance. When a call occurs, the mobile switching center (MSC) triggers an IDP message according to the CSI sent by the HLR. The IDP message includes service key parameters for the SCP to initiate specific services. The MSC sends the IDP message to the SCP, and the SCP initiates the user information inquiring mode according to the service key parameters after receiving the IDP message.

Alternatively, in the embodiment of the present invention, when a call occurs, the SCP may also initiate the user information inquiring mode of the SCP according to pre-configured information of the called terminal on the HLR (for example, notifying the SCP to process when the called terminal is called) or on the SCP.

The above method for initiating the user information inquiring mode may not only be applied in a CAMEL protocol in the GSM network, but also be applied in other networks, such as a PSTN network, a CDMA network, and an IP multimedia subsystem (IMS) network. In the CDMA network, the HLR supports the CSI information, and in the IMS network, the SHLR supports the CSI information.

In Step 22, the user information of the calling terminal is inquired according to the call request message of the calling terminal.

In this embodiment, the call request message of the calling terminal includes a calling terminal number and a called terminal number. The SCP may inquire the user information database to obtain the user information of the calling terminal, such as name, position and home location, according to the calling terminal number. The SCP may also inquire the user information database to obtain the user information of the calling terminal according to both the calling terminal number and the called terminal number. The user information database may be configured on the SCP, and may also be configured on an apparatus other than the SCP.

In Step 23, the user information of the calling terminal is selectively sent according to at least one of the user information of the calling terminal, a pre-configured phonebook of the called terminal, and a current work state of the called terminal. It specifically includes determining the strategy of the called terminal processing the call of the calling terminal, and the process proceeds to Step 24 if it is determined that the called terminal does not need to answer the call. The process proceeds to Step 25 if it is determined that the called terminal must answer the call currently. If it is determined that neither the called terminal does not need to answer the call nor the called terminal must answer the call currently, the process proceeds to Step 26.

In Step 24, the SCP sends a Release call message.

Herein, the MSC cuts off the call in response to receiving the Release call message from the SCP.

In Step 25, the SCP sends a Connect or Continue message by means of an ordinary call.

Herein, the MSC sends the call to the called terminal in response to receiving the Connect or Continue message, and what the called terminal receives is a call with a caller ID display in an ordinary way.

In Step 26, the user information of the calling terminal is sent to the called terminal.

In this embodiment of the present invention, the user information of the calling terminal may be sent to the called terminal in the following ways.

I. A USSD message carrying the user information of the calling terminal is sent to the called terminal. The USSD message further includes a menu for the called terminal to select, and the menu includes: "Agreeing to Answer," "Agreeing to Answer" (with background sound effects), "Rejecting to Answer" (with a reply of being busy), "Rejecting to Answer" (with a reply that the called number does not exist), "Rejecting to Answer" (with a reply of being out of reach), and so on.

II. A short message carrying the user information of the calling terminal is sent to the called terminal.

III. A message carrying a calling ID information is sent to the called terminal.

IV. A message carrying the user information of the calling terminal is sent to the interactive voice response (IVR) call center, and the IVR call center generates voice information including the user information of the calling terminal according to the message carrying the user information of the calling terminal, and sends the voice information to the called terminal. In which the way for the SCP to send the user information of the calling terminal to the IVR call center is that the SCP establishes a communication connection with the IVR call center, and sends a message carrying the user information of the calling terminal to the IVR call center.

In this embodiment of the present invention, the way of inquiring the user information of the calling terminal according to the call request message of the calling terminal and sending the user information of the calling terminal to the called terminal may also be the following ones.

The IVR call center may configure corresponding voice information for the called terminal according to the calling terminal number and the called terminal number in advance. The SCP sends a CONNECT message to the MSC, and the MSC establishes a connection with the IVR call center. Herein, the called terminal number field carried in the CONNECT message sent by the SCP is "an IVR call center number and an original called terminal number", and the calling terminal number field remains the same. Then the MSC forwards the call to the IVR call center according to the CONNECT message. The IVR call center may get the calling terminal number and the called terminal number from the above calling terminal number field and called terminal number field, and obtains the corresponding voice information including the user information of the calling terminal according to receiving a message that requires providing the user information of the calling terminal, and then sends the voice information to the called terminal.

In Step 27, the called terminal deals with the current call according to the received user information of the calling terminal, the process proceeds to Step 28 when the called terminal selects to answer the call, Step 29 is executed when selecting to reject the call, and the process proceeds to Step 30 when the called terminal neither selects to answer the call nor selects to reject the call.

In Step 28, a conversation connection is established.

Herein, the SCP instructs the MSC to establish a conversation connection for the calling terminal and the called terminal in response to receiving an answer response from the called terminal.

In Step 29, the call is cut off.

Herein, the SCP instructs the MSC to cut off the call in response to receiving an answer rejection response from the called terminal.

In Step 30, the call is cut off after a pre-defined period of time.

Herein, the SCP instructs the MSC to cut off the call without receiving any response in the period of time.

Finally, after the conversation ends or the call is cut off, the control process of the SCP also ends accordingly.

In this embodiment of the present invention, the called terminal may be provided with the user information of the calling terminal by expanding the service on the SCP, and so that the called terminal may select whether to answer the call or not according to the known information, which enables the user to choose expressly whether to answer the call or not.

Figure 3:
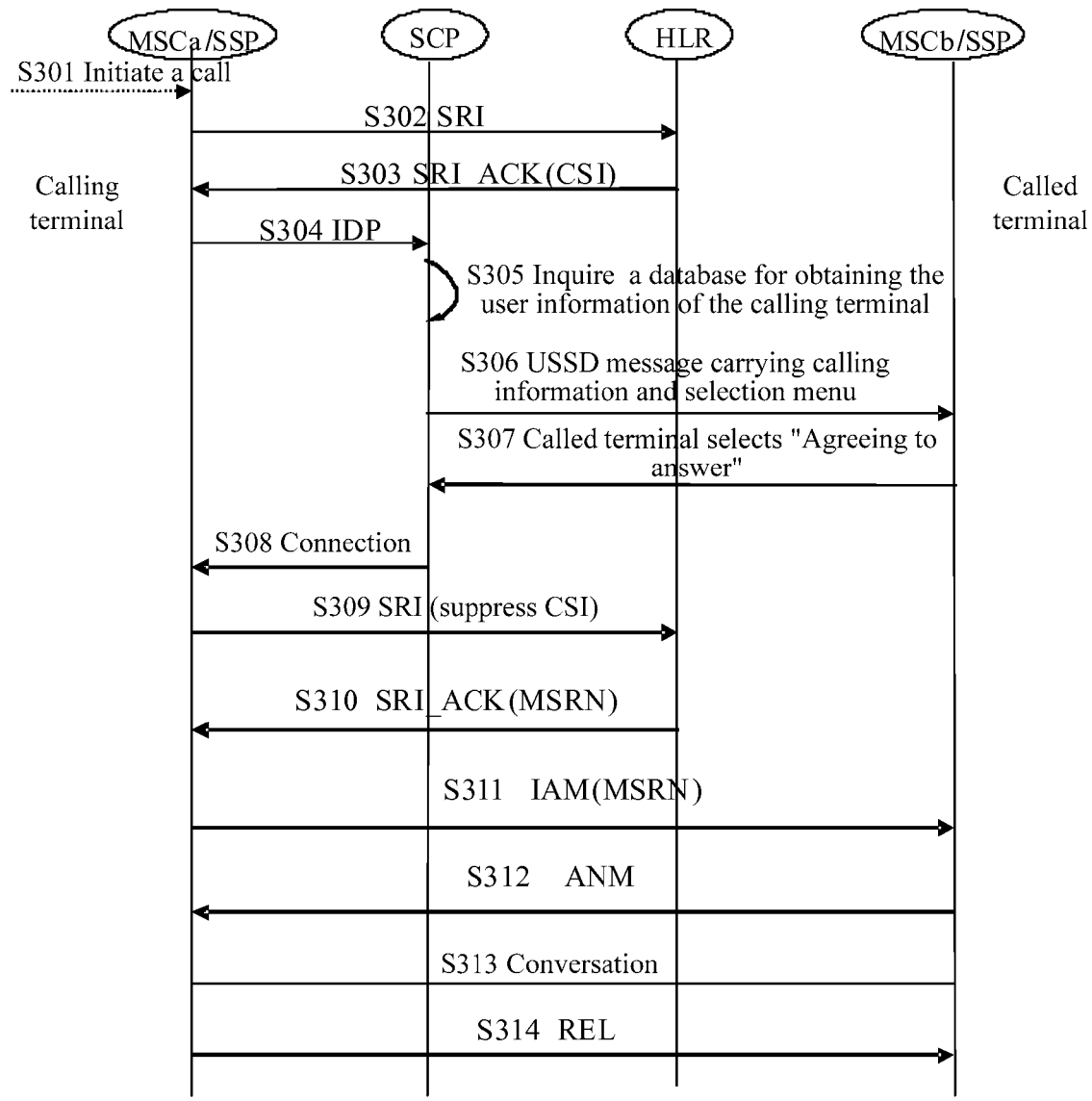
FIG. 3 is a schematic flowchart of a called terminal selecting to answer a call according to the method as shown in FIG. 2.

FIG. 3 is a schematic flowchart of the called terminal selecting to answer the call of according to the method as shown in FIG. 2. Referring to FIG. 3, in this embodiment, a flow that a call is initiated from the calling terminal, passes through the network, and finally is selected to be answered by the called terminal according to the user information of the calling terminal is as follows.

In Step 301, a user of the calling terminal initiates a call to an MSCa.

In Step 302, the MSCa/SSP sends a Send Routing Info (SRI) message to a home location register (HLR) to obtain a roaming number of the called terminal.

In Step 303, the HLR returns an SRI confirmation message including the CAMEL subscription information (CSI) to the MSCa/SSP.

Herein, the called terminal should have subscribed the service, so the CSI exists in the HLR.

In Step 304, the MSCa/SSP sends an IDP message to the SCP according to the CSI.

In Step 305, the SCP obtains the user information of the calling terminal, such as name, position and home location, by inquiring the database according to the known calling terminal number and the called terminal number.

In Step 306, the SCP sends the user information of the calling terminal to the called terminal via a USSD message, provides a menu selection, and the menu includes: "Agreeing to Answer", "Agreeing to Answer" (with background sound effects), "Rejecting to Answer" (with a reply of being busy), "Rejecting to Answer" (with a reply that the called number does not exist), and "Rejecting to Answer" (with a reply of being out of reach).

In Step 307, the called terminal selects the "Agreeing to Answer" displayed in the menu, and a message of selecting the "Agreeing to Answer" is sent to the SCP.

In Step 308, the SCP delivers a CONNECT message to the MSCa.

In Step 309, the MSCa sends an SRI message to the HLR for the second time, and the CSI is suppressed at the time.

In Step 310, the HLR returns the roaming number of the called terminal to the MSCa.

In Step 311, the MSCa sends an Initial Address Message (IAM) message to an MSCb.

In Step 312, the MSCb sends an answer message (ANM) to the MSCa.

In Step 313, the calling terminal and the called terminal carry out a normal conversation.

In Step 314, the calling terminal hangs up the call.

Figure 4:
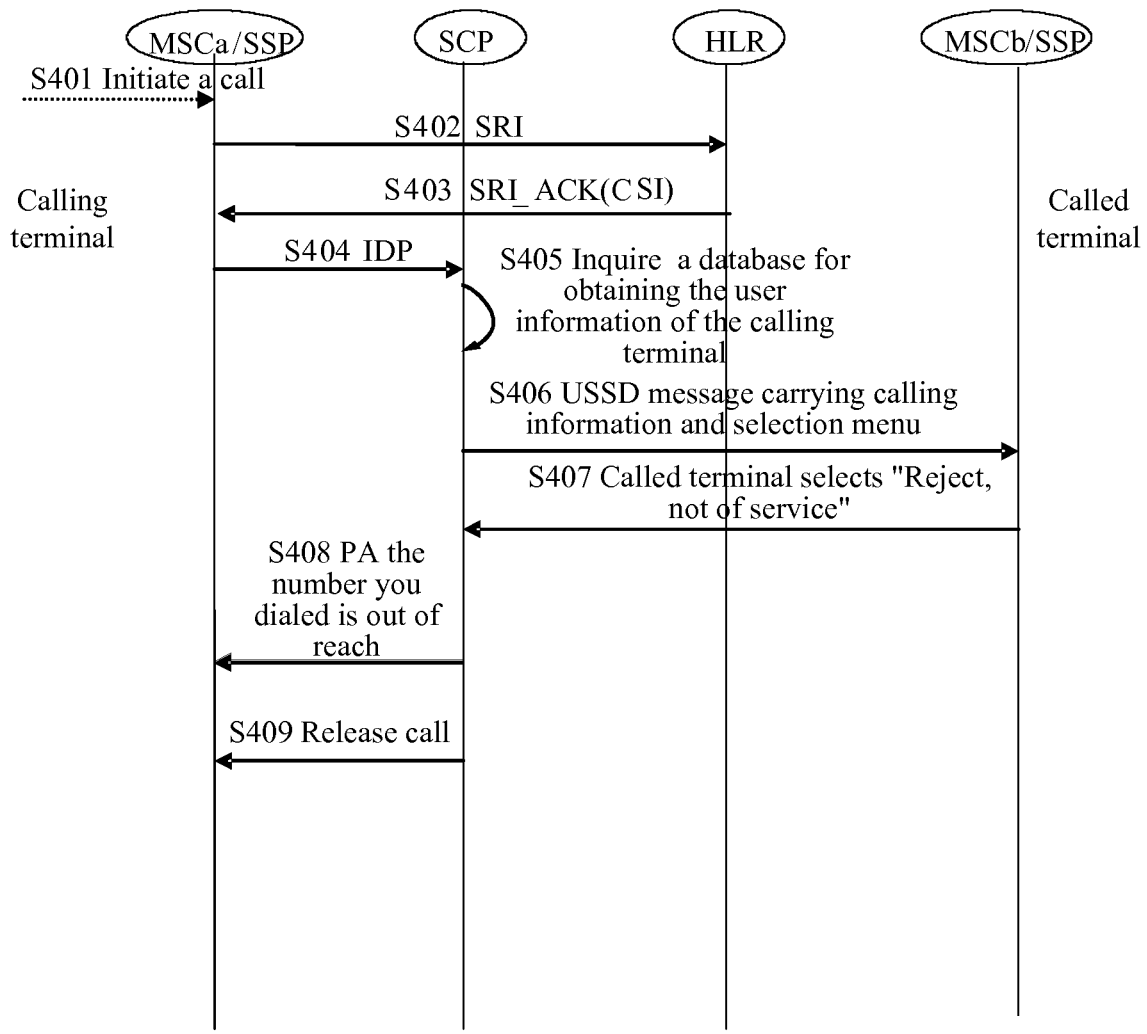
FIG. 4 is a schematic flowchart of the called terminal selecting to reject a call according to the method as shown in FIG. 2.

FIG. 4 is a schematic flowchart of the called terminal selecting to reject the call of the method as shown in FIG. 2. Referring to FIG. 4, in this embodiment, a flow that a call is initiated by the calling terminal, passes through the network, and finally is rejected by the called terminal according to the user information of the calling terminal is as follows.

In Step 401, the user of the calling terminal initiates a call to the MSCa.

In Step 402, the MSCa/SSP sends an SRI message to the HLR to obtain a roaming number of the called terminal.

In Step 403, the HLR returns an SRI confirmation message including the CSI to the MSCa/SSP.

Herein, the called terminal should have subscribed the service, so the CSI exists in the HLR.

In Step 404, the MSCa/SSP sends an IDP message to the SCP according to the CSI.

In Step 405, the SCP obtains the user information of the calling terminal, such as name, position and home location, by inquiring the database according to the known calling terminal number and the called terminal number.

In Step 406, the SCP sends the user information of the calling terminal to the called terminal via a USSD message, and provides a menu selection, and the menu selection includes: "Agreeing to Answer," "Agreeing to Answer" (with background sound effects), "Rejecting to Answer" (with a reply of being busy), "Rejecting to Answer" (with a reply that the called number does not exist), and "Rejecting to Answer" (with a reply of being out of reach).

In Step 407, the called terminal selects the "Rejecting to Answer" (with a reply of being out of reach) displayed in the menu, and a message of rejecting to answer is sent to the SCP.

In Step 408, the SCP delivers a play announcement (PA) message to the MSCa, and a voice "the number you dialed is not reachable" is played to the user of the calling terminal.

In Step 409, the SCP delivers a Release Call message to the MSCa, thereby cutting off the call.

The above method of providing the called terminal with the user information of the calling terminal for realizing call management may be applied in universal scenes. For example, when one side does not want the other side to know his or her number, he or she may select the "Rejecting to Answer" (with a reply that the called number does not exist) in the menu. For the operator, the service may increase a degree of satisfaction of the terminal user.

The method according to embodiments of the present invention may be achieved with a cooperation of the SCP, and all the messages transferred in the network are standard messages, so the compatibility with the network is good.

Accordingly, the embodiments of the present invention also provide a system for realizing call management. With the system, when the calling terminal initiates a call to the called terminal, the called terminal is able to select whether to answer the call or not according to the received user information of the calling terminal.

Figure 5:
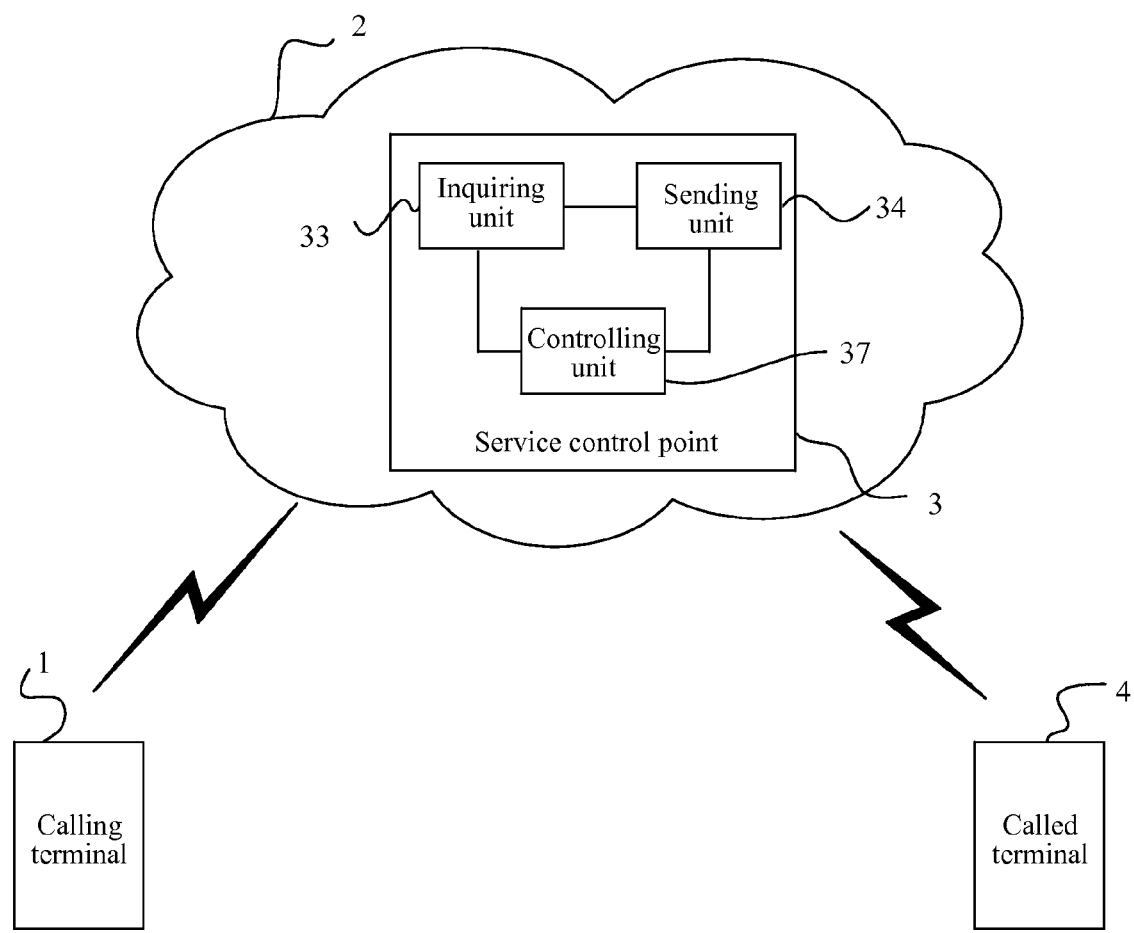
FIG. 5 is a schematic diagram of a network for realizing call management according to an embodiment of the present invention.

FIG. 5 is a schematic diagram of a network for realizing call management according to an embodiment of the present invention. As shown in FIG. 5, the network includes a calling terminal 1, a system for realizing call management 2, and a called terminal 4. The system for realizing call management 2 includes an SCP 3, and the SCP 3 includes an inquiring unit 33, a sending unit 34, and a controlling unit 37.

The inquiring unit 33 is adapted to inquire user information of a calling terminal according to call request message of the calling terminal.

In this embodiment, the inquiring unit 33 inquires the user information of the calling terminal, which may be name, position, home location, and so on, from the user information database according to the call request message of the calling terminal. The user information database may be stored in the SCP 3, and may also be stored in an apparatus other than the SCP 3.

The call request message of the calling terminal includes the number of the calling terminal 1 and the number of the called terminal 4. The inquiring unit 33 may inquire the user information of the calling terminal 1 according to the number of the calling terminal 1 and the number of the called terminal 4, and may also inquire the user information of the calling terminal 1 according to the number of the calling terminal 1.

The sending unit 34 is adapted to send the user information of the calling terminal 1.

In this embodiment, the sending unit 34 may send the user information of the calling terminal to the called terminal by a short message, a USSD message, a caller ID display, an IVR call, or the like. Herein, the sending unit 34 also receives various messages sent to the SCP 3 in the system for realizing call management 2.

The controlling unit 37 is adapted to exercise a corresponding control according to a response made by the called terminal to the call carrying the user information of the calling terminal. In this embodiment, the called terminal 4 receives the call carrying the user information of the calling terminal 1 via the system for realizing call management 2, and selects whether to answer the call or not according to the received user information of the calling terminal 1. When the called terminal 4 selects to answer the call, the controlling unit 37 instructs another apparatus (e.g., the MSC) in the system for realizing call management 2 to establish a conversation connection between the calling terminal 1 and the called terminal 4, according to the response of the selecting to answer the call of the called terminal 4, and when the call ends, the control process of the SCP ends. When the called terminal 4 selects to reject the call, the controlling unit 37 instructs to cut off the call according to the response of the selecting to reject the call of the called terminal 4 received by the SCP. For the case that the called terminal performs no operation on the call (neither selecting to answer the call nor selecting to reject the call), the SCP considers it as a response, and the controlling unit 37 instructs to cut off the call after a pre-set period of time.

Figure 6:
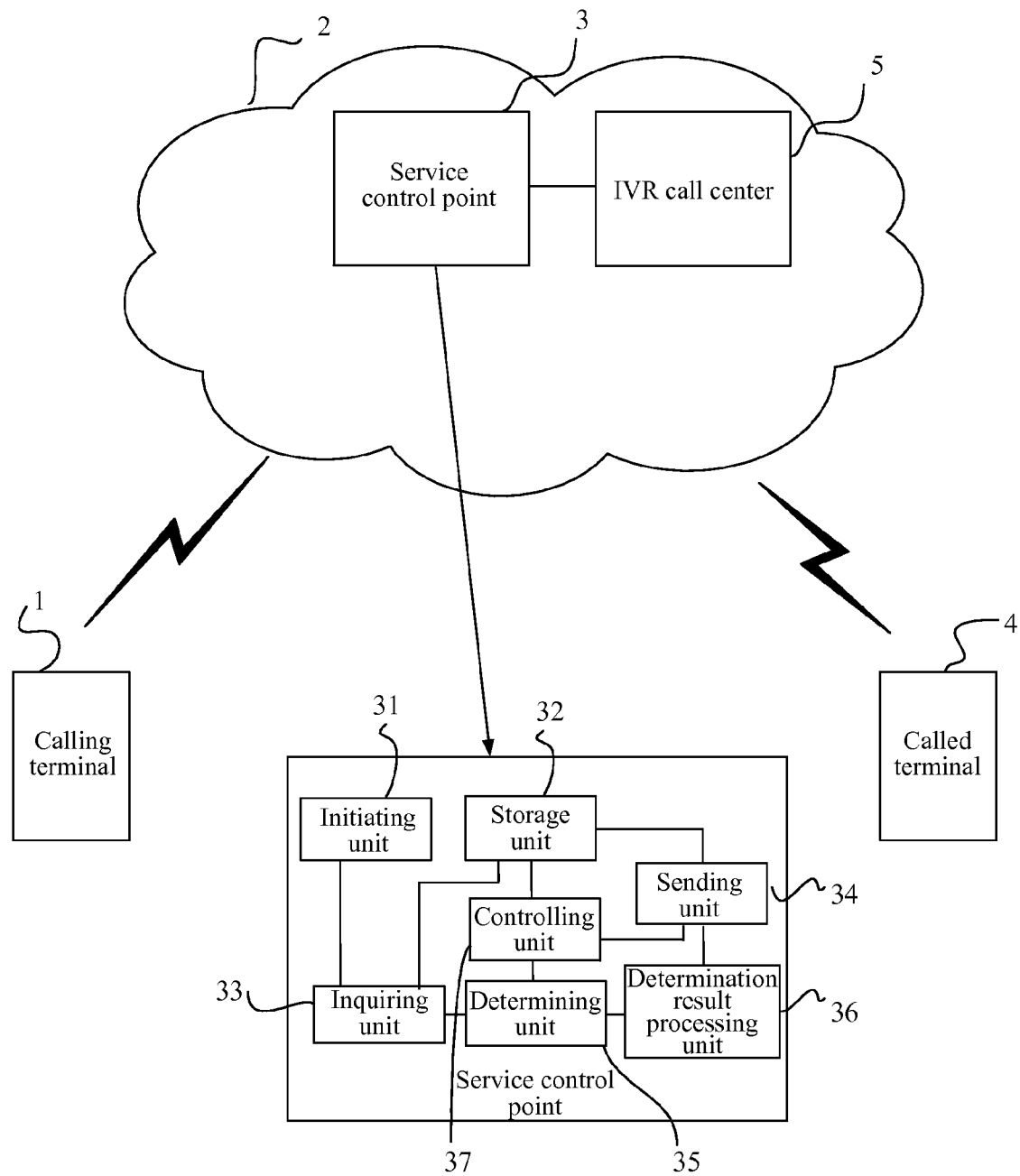
FIG. 6 is a schematic diagram of the network for realizing call management according to another embodiment of the present invention.

FIG. 6 is a schematic diagram of the network for realizing call management according to another embodiment of the present invention. As shown in FIG. 6, it includes a calling terminal 1, a system for realizing call management 2, and a called terminal 4. The system for realizing call management 2 includes an SCP 3, and the SCP 3 includes an initiating unit 31, a storage unit 32, an inquiring unit 33, a sending unit 34, a determining unit 35, a determination result processing unit 36 and a controlling unit 37.

The initiating unit 31 is adapted to initiate a user information inquiring mode.

In the embodiment, the CSI of the terminal may be set in the HLR in advance. When a call occurs, the MSC may trigger an IDP message according to the CSI sent by the HLR, in which the IDP message includes service key parameters for the SCP to initiate specific services. The MSC sends the IDP message to the SCP, and the initiating unit 31 may initiate the user information inquiring mode according to the received IDP message. Optionally, in the embodiment, when a call occurs, the SCP may also initiate the user information inquiring mode of the SCP according to the pre-configured information of the called terminal on the HLR (for example, notifying the SCP to process when the called terminal is called) or on the SCP3.

The above process for initiating the user information inquiring mode may not only be applied in the CAMEL protocol in the GSM network, but also be applied in other networks, such as a PSTN network, a CDMA network, and an IMS network. In the CDMA network, the HLR supports the CSI information, and in the IMS network, the SHLR supports the CSI information.

The storage unit 32 is adapted to store the user information database.

The inquiring unit 33 is adapted to inquire the user information of the calling terminal from the storage unit 32 according to the call request message of the calling terminal.

In this embodiment, the inquiring unit 33 inquires the user information of the calling terminal 1, which may be name, position, home location, and so on, from the user information database stored in the storage unit 32 according to the call request message of the calling terminal. It should be noted that, the user information database is not necessarily stored in the SCP 3 or the storage unit 32 in the SCP 3, and it may also be stored in another apparatus in the system for realizing call management 2.

The call request message of the calling terminal includes a number of the calling terminal and a number of the called terminal. The inquiring unit 33 may inquire the user information of the calling terminal according to the number of the calling terminal and the number of the called terminal, and may also inquire the user information of the calling terminal according to the number of the calling terminal.

In this embodiment, the inquired user information of the calling terminal may be name, position, home location, and other information.

The sending unit 34 is adapted to send the user information of the calling terminal.

In this embodiment, the sending unit 34 may not only send the user information of the calling terminal, but also send other various messages that the SCP 3 needs to send, and may also receive various messages sent to the SCP 3 in the system for realizing call management 2.

In this embodiment, the sending unit 34 sends a message carrying the user information of the calling terminal to the called terminal 4. The message carrying the user information of the calling terminal sent by the sending unit 34 may be a USSD message or a short message. When the sent message is the USSD message, the USSD message further includes a menu for the called terminal to select, which includes "Agreeing to Answer," "Agreeing to Answer" (with background sound effects), "Rejecting to Answer" (with a reply of being busy), "Rejecting to Answer" (with a reply that the called number does not exist, "Rejecting to Answer" (with a reply of being out of reach), and so on.

The determining unit 35 is adapted to determine a processing on the call of the calling terminal performed by the called terminal according to at least one of the user information of the calling terminal, the pre-set phonebook of the called terminal and the current work state of the called terminal.

The determination result processing unit 36 is adapted to selectively send the user information of the calling terminal according to a determination result.

The determination result processing unit 36 selectively sending the user information of the calling terminal according to the determination result includes: instructing the sending unit 34 to send a release call message to the MSC when the determination result is that the called terminal does not need to answer the call; instructing the sending unit 34 to send a Connect or Continue message to the MSC (in a way of continuing an ordinary all) when the determination result is that the called terminal must answer the call unconditionally at present. When the determination result is that neither the called terminal does not need to answer the call nor the called terminal must answer the call currently, instructing the sending unit 34 to send the user information of the calling terminal.

Optionally, in this embodiment, the system for realizing call management 2 also includes: an IVR call center 5, which is adapted to receive the message sent by the SCP, generate a voice information carrying the user information of the calling terminal according to the message, and send the voice information to the called terminal, and the process of which may be carried out in following two ways.

I. The sending unit 34 sends a message including the user information of the calling terminal to the IVR call center 5. The IVR call center 5 generates voice information including the user information of the calling terminal, and sends the voice information to the called terminal.

II. The IVR call center 5 may configures corresponding voice information for the called terminal 4 according to the number of the calling terminal 1 and the number of the called terminal 4 in advance. The sending unit 34 sends a CONNECT message to the MSC. Herein, the called terminal number field carried in the CONNECT message sent by the SCP 3 is "an IVR call center number and an original called terminal number", and the calling terminal number field remains the same. The MSC establishes a connection with the IVR call center, and then forwards the CONNECT message to the IVR call center 5 according to the CONNECT message.

The IVR call center 5 obtains the number of the calling terminal 1 and the number of the called terminal 4 from the above received calling terminal number field and called terminal number field. The corresponding voice information including the user information of the calling terminal 1 is obtained according to the received information, and the IVR call center 5 sends the voice information to the called terminal.

The controlling unit 37 is adapted to exercise corresponding control according to the response made by the called terminal to the call carrying the user information of the calling terminal.

In this embodiment, the called terminal 4 receives the call carrying the user information of the calling terminal 1 via the system for realizing call management 2, and selects whether to answer the call or not according to the received user information of the calling terminal 1. When the called terminal 4 selects to answer the call, the controlling unit 37 instructs another apparatus (e.g., the MSC) in the system for realizing call management 2 to establish a conversation connection between the calling terminal 1 and the called terminal 4, according to the response of answer selection of the called terminal 4 received by the sending unit 34, and the control process of the SCP ends after the conversation ends. When the called terminal 4 selects to reject the call, the controlling unit 37 instructs to cut off the call according to the response of the selecting to reject the call of the called terminal 4 received by the SCP. For the case that the called terminal performs no operation on the call (neither selecting to answer the call nor selecting to reject the call), the SCP considers it as a response, and the controlling unit 37 instructs to cut off the call after a pre-set period of time.

The above system of providing the called terminal with the user information of the calling terminal for realizing call management may be applied in universal scenes, and for the operator, the service may increase a degree of satisfaction of the terminal user. All messages transferred by the system of the embodiment of the present invention in the network are standard messages, and the user information of the calling terminal may be inquired merely by expanding the functional module on the SCP, so the compatibility with the network is good.

Figure 7:
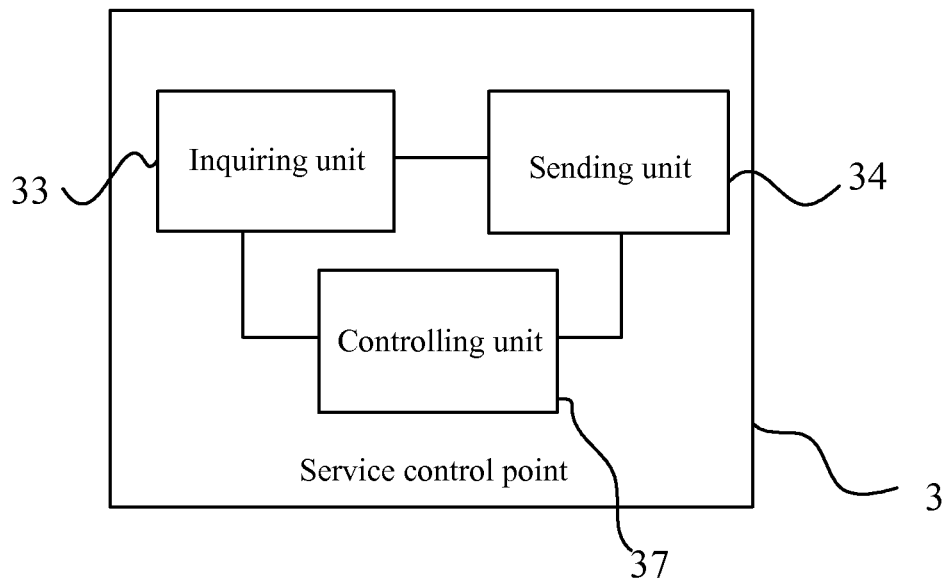
FIG. 7 is a schematic structure diagram of an SCP according to an embodiment of the present invention.

FIG. 7 is a schematic structure diagram of the SCP according to an embodiment of the present invention. As shown in FIG. 7, the SCP 3 includes an inquiring unit 33, a sending unit 34, and a controlling unit 37.

The inquiring unit 33 is adapted to inquire user information of a calling terminal according to a call request message of the calling terminal.

In this embodiment, the inquiring unit 33 inquires the user information of the calling terminal 1, which may be name, position and home location, and so on, from the user information database according to the call request message of the calling terminal. The user information database may be stored in the SCP 3, and may also be stored in an apparatus other than the SCP 3.

The call request message of the calling terminal includes the number of the calling terminal and the number of the called terminal. The inquiring unit 33 may inquire the user information of the calling terminal 1 according to the number of the calling terminal and the number of the called terminal, and may also inquire the user information of the calling terminal according to the number of the calling terminal.

The sending unit 34 is adapted to send the user information of the calling terminal to the called terminal.

In this embodiment, the sending unit 34 may send the user information of the calling terminal to the called terminal by a short message, a USSD message, a caller ID display, an IVR call, or the like.

The controlling unit 37 is adapted to exercise a corresponding control according to the response made by the called terminal to the call carrying the user information of the calling terminal.

In this embodiment, the SCP receives the response made by the called terminal to the call carrying the user information of the calling terminal, and the controlling unit 37 exercises a corresponding control according to the response made by the called terminal. If the called terminal selects to answer the call according to the user information of the calling terminal, the controlling unit 37 instructs another apparatus (e.g., the MSC) in the communication network to establish a conversation connection between the calling terminal and the called terminal, and the control process of the SCP ends after the call ends. If the called terminal selects to reject the call, the controlling unit 37 instructs to cut off the call. For the case that the called terminal performs no operation on the call (neither selecting to answer the call, nor selecting to reject the call), the SCP considers it as a response, and the controlling unit 37 instructs to cut off the call after a period of time pre-set by the SCP.

Figure 8:
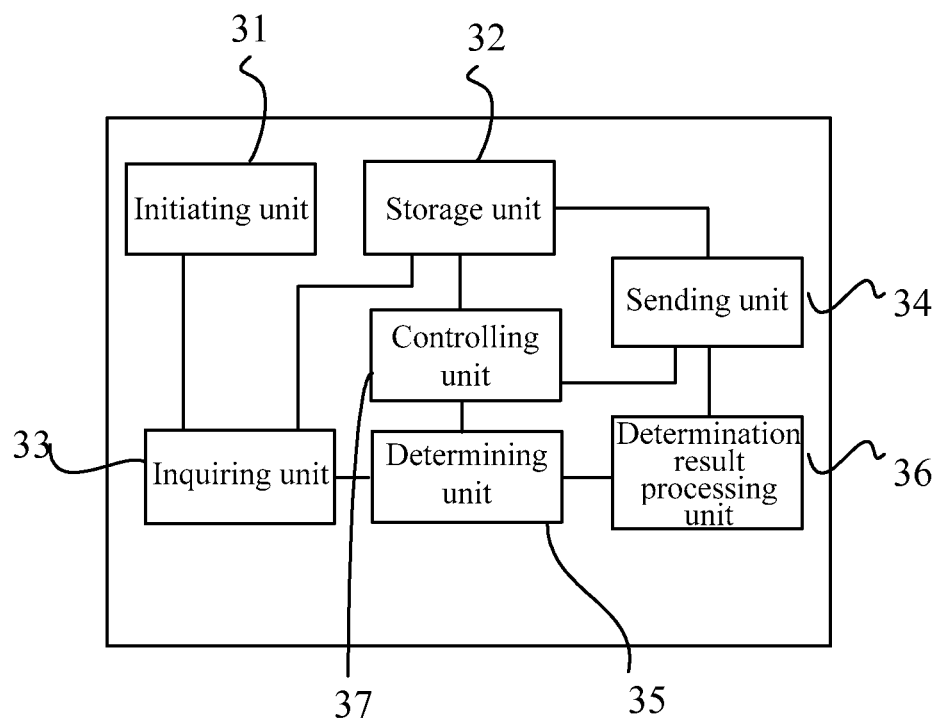
FIG. 8 is a schematic structure diagram of the SCP according to another embodiment of the present invention.

FIG. 8 is a schematic structure diagram of the SCP according to another embodiment of the present invention. As shown in FIG. 8, the SCP 3 includes an initiating unit 31, a storage unit 32, an inquiring unit 33, a sending unit 34, a determining unit 35, a determination result processing unit 36 and a controlling unit 37.

The initiating unit 31 is adapted to initiate the user information inquiring mode of the SCP.

In the communication network, the MSC may trigger an IDP message according to the CSI sent by the HLR, in which the IDP message includes service key parameters for the SCP to initiate specific services. The MSC sends the IDP message to the SCP, and the SCP initiates the service subscribed by the user according to the service key parameters after receiving the IDP message. In this embodiment, if the called terminal has subscribed the service of inquiring the user information, the initiating unit 31 in the SCP 3 may initiate the user information inquiring mode according to the received IDP message. Optionally, in this embodiment, when a call occurs, the SCP may also initiate the user information inquiring mode of the SCP according to the pre-configured information of the called terminal (for example, the called terminal makes a configuration on the HLR to notify the SCP to process when being called or makes a configuration on the SCP to provide the user information when being called).

The above method for initiating the user information inquiring mode may not only be applied in the CAMEL protocol in the GSM network, but also be applied in other networks, such as a PSTN network, a CDMA network, and an IMS network.

The storage unit 32 is adapted to store the user information database.

The inquiring unit 33 is adapted to inquire the user information of the calling terminal according to the call request message of the calling terminal.

In this embodiment, the inquiring unit 33 inquires the user information of the calling terminal 1, which may be name, position, home location, and so on, from the user information database stored in the storage unit 32 according to the call request message of the calling terminal. The call request message of the calling terminal includes the number of the calling terminal 1 and the number of the called terminal 4. The inquiring unit 33 may inquire the user information of the calling terminal according to the number of the calling terminal and the number of the called terminal, and may also inquire the user information of the calling terminal according to the number of the calling terminal.

In this embodiment, the inquired user information of the calling terminal 1 may be name, position, home location, and other information.

The sending unit 34 is adapted to send the user information of the calling terminal to the called terminal.

In this embodiment, the sending unit 34 may not only send the user information of the calling terminal, but also send other various messages that the SCP needs to send.

The sending unit 34 may send the message including the user information of the calling terminal to the called terminal. The message including the user information of the calling terminal sent by the sending unit 34 may be a USSD message or a short message. When the sent message is the USSD message, the USSD message further includes a menu for the called terminal to select, which includes: "Agreeing to Answer," "Agreeing to Answer" (with background sound effects), "Rejecting to Answer" (with a reply of being busy), "Rejecting to Answer" (with a reply that the called number does not exist, "Rejecting to Answer" (with a reply of being out of reach), and so on.

The determining unit 35 is adapted to determine a processing on the call of the calling terminal by the called terminal according to at least one of the user information of the calling terminal, the pre-set phonebook of the called terminal and the current work state thereof.

The determination result processing unit 36 is adapted to selectively send the user information of the calling terminal according to a determination result.

The determination result processing unit 36 selectively sending the user information of the calling terminal according to the determination result includes instructing the sending unit 34 to send a release call message to the MSC when the determination result is that the called terminal does not need to answer the call; instructing the sending unit 34 to send a Connect or Continue message to the MSC (it is the case of continuing an ordinary all at the time) when the determination result is that the called terminal must answer the call unconditionally at present; or when the determination result is that neither the called terminal does not need to answer the call nor the called terminal must answer the call currently, instructing the sending unit 34 to send the user information of the calling terminal.

The controlling unit 37 is adapted to exercise a corresponding control according to a response made by the called terminal to the call carrying the user information of the calling terminal.

In this embodiment, the SCP receives the response made by the called terminal to the call carrying the user information of the calling terminal, and the controlling unit 37 exercises a corresponding control according to the response made by the called terminal. If the called terminal selects to answer the call according to the user information of the calling terminal, the controlling unit 37 instructs another apparatus (e.g., the MSC) in the communication network to establish a conversation connection between the calling terminal and the called terminal, and after the conversation ends, the control process of the SCP ends. If the called terminal selects to reject the call, the controlling unit 37 instructs to cut off the call. For the case that the called terminal performs no operation on the call (neither selecting to answer the call, nor selecting to reject the call), the SCP considers it as a response, and the controlling unit 37 instructs to cut off the call after a pre-set period of time.

All messages used by the SCP of the embodiment of the present invention are standard messages used to be transferred in the network, and the user information of the calling terminal may be obtained merely by expanding some function module, and provided to the called terminal for use in a convenient way, and therefore, the compatibility with the network is good.

Accordingly, the embodiments of the present invention also provide a communication terminal, which includes a receiving unit and a selecting unit.

The receiving unit is adapted to receive the user information of the calling terminal.

Herein, the way for the receiving unit to receive the user information of the calling terminal includes a short message, a USSD message, a language message, and a caller ID display. The user information of the calling terminal may arrive at the called terminal at the same time with the call of the calling terminal, and the user information of the calling terminal may also arrive at the called terminal in advance.

The selecting unit is adapted to select whether to answer the call or not according to the user information of the calling terminal.

Herein, the mobile terminal as the called terminal selects whether to answer the call or not according to the user information of the calling terminal, in which the modes for selection include: "Agreeing to Answer," "Agreeing to Answer" (with background sound effects), "Rejecting to Answer" (with a reply of being busy), "Rejecting to Answer" (with a reply that the called number does not exist, "Rejecting to Answer" (with a reply of being out of reach), and so on.

Finally, those with ordinary skills in the art may appreciate that all or part of the steps in the methods of the above embodiment may be accomplished by a hardware related to program instructions. These programs may be stored in a computer readable storage medium, and perform all or part of following steps when executed.

The user information of the calling terminal is inquired according to the call request message of the calling terminal.

The user information of the calling terminal is sent to the called terminal.

A conversation connection is established when the called terminal determines to answer the call according to the sent user information of the calling terminal. Otherwise, no conversation connection is established.

The storage medium is, for example, a ROM/RAM, a magnetic disk, an optical disk, and the like.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A method for realizing call management, comprising:
    inquiring, by a service control point (SCP), user information of a calling terminal according to a call request message of the calling terminal forwarded by a mobile switching center (MSC);
    sending a release call message if a called terminal does not need to answer a call;
    sending a Connect/Continue message in a way of continuing an ordinary call if the called terminal must answer the call currently;
    sending the user information of the calling terminal to the called terminal, wherein the user information is comprised in one of the following: an unstructured supplementary service data message, a short message, and voice information; and
    judging, by the SCP, whether to establish a conversation connection between the called terminal and the calling terminal according to a response made by the called terminal over a call carrying the user information of the calling terminal;
    wherein the unstructured supplementary service data message comprises a menu provided for the called terminal to select to answer the call with background sound effects, or not to answer the call with a reply of being busy, or not to answer the call with a reply of being out of reach.

2. The method according to claim 1 further comprising the initiating a user information inquiring mode before inquiring the user information of the calling terminal according to the call request message of the calling terminal.

3. The method according to claim 2, wherein initiating the user information inquiring mode comprises initiating the user information inquiring mode after receiving an initial detect point message sent by the MSC.

4. The method according to claim 2, wherein the initiating the user information inquiring mode comprises initiating the user information inquiring mode according to pre-configured information of the called terminal when the call occurs.

5. A system for realizing call management comprising:
    a service control point (SCP), adapted to inquire user information of a calling terminal according to a call request message of the calling terminal forwarded by a mobile switching center (MSC), send a release call message if a called terminal does not need to answer a call; send a Connect/Continue message in a way of continuing an ordinary call if the called terminal must answer the call currently; send the user information of the calling terminal to the called terminal, wherein the user information is comprised in one of the following: an unstructured supplementary service data message, a short message, and voice information, and judge whether to establish a conversation connection between the called terminal and the calling terminal, according to a response made by the called terminal over a call carrying the user information of the calling terminal;

wherein the unstructured supplementary service data message comprises a menu provided for the called terminal to select to answer the call with background sound effects, or not to answer the call with a reply of being busy, or not to answer the call with a reply of being out of reach.

6. The system according to claim 5, the SCP further comprising:
an inquiring unit, adapted to inquire the user information of the calling terminal according to the call request message of the calling terminal;
a sending unit, adapted to send the user information of the calling terminal to the called terminal; and
a controlling unit, adapted to exercise the corresponding call control according to the response made by the called terminal to the call carrying the user information of the calling terminal.

7. The system according to claim 6, wherein the SCP further comprises:
an initiating unit, adapted to initiate a user information inquiring mode.

8. The system according to claim 7, wherein the SCP further comprises:
a judging unit, adapted to judge whether the called terminal does not need to answer the call or must answer the call currently according to at least one of the user information of the calling terminal, a pre-configured phonebook of the called terminal and a current work status of the called terminal; and
a determination result processing unit, adapted to selectively send the user information of the calling terminal according to a determination result.

9. The system according to claim 5, further comprising:
an interactive voice response call center, adapted to receive a message carrying the user information of the calling terminal sent by the SCP, generate voice information carrying the user information of the calling terminal according to the message, and send the voice information to the called terminal.

10. A computer readable non-transitory medium having program codes stored thereon the program codes being executable by one or more digital processor for providing call management, the program codes comprising:
instructions for inquiring, user information of a calling terminal according to a call request message of the calling terminal;
instructions for sending a release call message if a called terminal does not need to answer a call;
instructions for sending a Connect/Continue message in a way of continuing an ordinary call if the called terminal must answer the call currently;
instructions for sending the user information of the calling terminal to the called terminal, wherein the user information is comprised in one of the following: an unstructured supplementary service data message, a short message, and voice information; and
instructions for judging whether to establish a conversation connection between the called terminal and the calling terminal according to a response made by the called terminal over a call carrying the user information of the calling terminal;
wherein the unstructured supplementary service data message comprises a menu provided for the called terminal to select to answer the call with background sound effects, or not to answer the call with a reply of being busy, or not to answer the call with a reply of being out of reach.

11. The computer readable non-transitory medium according to claim 10, wherein the program codes further comprises:
instructions for initiating a user information inquiring mode after receiving an initial detect point message sent by a mobile switching center.

12. The computer readable non-transitory medium according to claim 10, wherein the program codes further comprises:
instructions for initiating a user information inquiring mode according to pre-configured information of the called terminal when the call occurs.

13. The method according to claim 1, wherein the step of inquiring user information of the calling terminal comprises inquiring the user information of the calling terminal from a user information database.

14. The method according to claim 13, wherein the user information database is configured on the SCP or an apparatus other than the SCP.

* * * * *